United States Patent [19] [11] Patent Number: 4,490,328
Schoening et al. [45] Date of Patent: Dec. 25, 1984

[54] BOTTOM SHIELD FOR A GAS COOLED HIGH TEMPERATURE NUCLEAR REACTOR

[75] Inventors: Josef Schoening, Hambruecken; Hans-Georg Schwiers, Ketsch; Claus Elter, Bad Durkheim; Wilfried Stracke, Oftersheim; Hans-Juergen Kolodzey, Ketsch, all of Fed. Rep. of Germany

[73] Assignee: Hochtemperatur-Reaktorbau GmbH., Cologne, Fed. Rep. of Germany

[21] Appl. No.: 359,838

[22] Filed: Mar. 19, 1982

[30] Foreign Application Priority Data

Apr. 10, 1981 [DE] Fed. Rep. of Germany ....... 3114480

[51] Int. Cl.³ ............................................. G21C 11/08
[52] U.S. Cl. .................................... 376/285; 376/289; 376/389
[58] Field of Search ............... 376/287, 381, 382, 383, 376/280; 376/362, 461, 463, 389, 399, 377, 285, 458, 459, 289

[56] References Cited

U.S. PATENT DOCUMENTS

| 2,932,745 | 4/1960 | Alberti et al. | 376/287 X |
| 3,056,028 | 9/1962 | Mattingly | 376/287 X |
| 3,140,235 | 7/1964 | Hatch et al. | 376/381 X |
| 3,175,958 | 3/1965 | Bourgade | 376/287 |
| 3,560,338 | 2/1971 | Brown | 376/362 X |
| 3,937,650 | 2/1976 | Jungmann | 326/289 |
| 4,032,397 | 6/1977 | Beine et al. | 376/293 |
| 4,189,347 | 2/1980 | Reatler | 376/381 |
| 4,302,293 | 11/1981 | Elter et al. | 376/381 |

FOREIGN PATENT DOCUMENTS

| 3027506 | 2/1982 | Fed. Rep. of Germany | 376/287 |
| 3027507 | 2/1982 | Fed. Rep. of Germany | 376/381 |
| 2054246 | 2/1981 | United Kingdom | 376/381 |

Primary Examiner—Richard E. Schafer
Assistant Examiner—Daniel Wasil
Attorney, Agent, or Firm—Schwartz, Jeffery, Schwaab, Mack, Blumenthal & Koch

[57] ABSTRACT

A gas cooled, high temperature nuclear reactor is provided with a base plate arranged under the reactor core and over the bottom of the prestressed concrete pressure vessel serving as the bottom shield. The bottom shield comprises at least two plates arranged coaxially with respect to each other, one above the other. Each plate comprises several partially interconnected parts with the lower plate being placed at an axial and vertical distance from the bottom liner of the prestressed concrete pressure vessel and also from the upper plate.

10 Claims, 5 Drawing Figures

BOTTOM SHIELD FOR A GAS COOLED HIGH TEMPERATURE NUCLEAR REACTOR

BACKGROUND OF THE INVENTION

1. Field of the Invention

The invention concerns a gas cooled high temperature nuclear reactor and a bottom shield therefor having a base plate, arranged under the reactor core and over the bottom of the prestressed concrete pressure vessel in a horizontal manner.

2. Background of the Prior Art

The dead weight of the reactor core and of the bottom and side reflectors and the thermal side shield are supported by a bottom shield in one type of nuclear reactor in a concrete pressure vessel. The loads resulting from rod forces in the reactor and possible external forces such as earthquakes must be absorbed by the bottom shield and transmitted to the prestressed concrete pressure vessel. The bottom shield also serves to protect the bottom liner of the prestressed concrete pressure vessel against excessive nuclear radiation and temperatures.

SUMMARY OF THE INVENTION

It is an object of the invention to provide a gas cooled high temperature reactor with a bottom shield capable of functioning in a manner so that the above-cited thermal, nuclear and weight considerations are provided for as ideally as possible. Thus, any detrimental action by thermal, nuclear and weight forces are presented by an economical and simple construction of a bottom shield.

The objects are attained according to the invention by a bottom shield comprising at least two plates arranged over and coaxially with respect to each other. These two plates will be referred to hereinafter as the first and second plates or as the upper and lower plates respectively. Each of the plates comprise several parts partially connected with each other with the lower plate being arranged at an axial and vertical distance, respectively, both from the bottom liner of the prestressed concrete pressure vessel and the upper plate.

In advantageous embodimentsof the invention, the bottom shield may contain a first plate above the second plate with a second plate having a greater thickness than the thickness of the first plate. In addition, a means for spacing the first plate from the second plate may comprise a plurality of bearing supports. Similarly, a means for spacing the second plate from the bottom liner of the cavity in the concrete pressure vessel of a nuclear reactor installation advantageously comprises a plurality of bearing supports. The bearing supports between the bottom liner and the second plate are spaced at a greater distance from one another than the bearing supports between the first and second plates. The individual plate members are comprised of circular segments having overlapping areas which form the plate member seams. In the overlapping area, pins are positioned forming the seams of the interconnected plate members.

An annular supporting ring formed of a plurality of interconnected supporting ring members surrounds the second or lower plate in an advantageous embodiment of the instant invention. The first or upper plate member may advantageously display a ribbed lower surface to aid in the circulation of cooling gas between the first and second plates. In addition, the upper plate may advantageously carry a plurality of sheet metal plates secured in spaced relationship to one another on the upper surface. As an advantageous alternative, the upper surface of the first plate may display a waffle like pattern.

The bottom shield arranged in this manner including the support arrangement provides the essential advantage that the loads to be transmitted are transferred to the prestressed concrete pressure vessel in a uniform distribution. Furthermore, the distances of the upper and the lower bearing supports are chosen so that the different stiffnesses of the two bottom shield plates are balanced with respect to each other. Further advantages of the invention are described in the following.

During the operation of the nuclear reactor according to the present invention, the temperature profile over the plate thicknesses is substantially reduced as the result of the division in a thin upper and a thick lower plate with a cooling gap provided between them. Because of the segmented construction with concentric partition gaps, whereby the segments are mechanically joined only within the inner half of the radius, the individual segments are able to expand freely in relation to each other, since the radial temperature profile may be maintained very small. The division of the lower plate into a circular plate and an annular ring further results in the fact that parts stressed differently by the temperature and the imposition of loads are allowed to move freely. By virtue of the special configuration of the top side of the upper plate, which may be provided both with a flat or a waffle structure, an additional bypass flow may be effected for cooling purposes. When the top side of the upper plate has a flat configuration and consists of individual cover plates with expansion gaps arranged between them, this may be used as thermal insulation and to facilitate the sliding of the graphite structures.

BRIEF DESCRIPTION OF THE DRAWING

In the following, an embodiment of the invention is described in more detail with reference to the drawing attached hereto.

In the drawing

DETAILED DESCRIPTION OF THE PREFERRED EMBODIMENTS

Figures 1A, 1B:
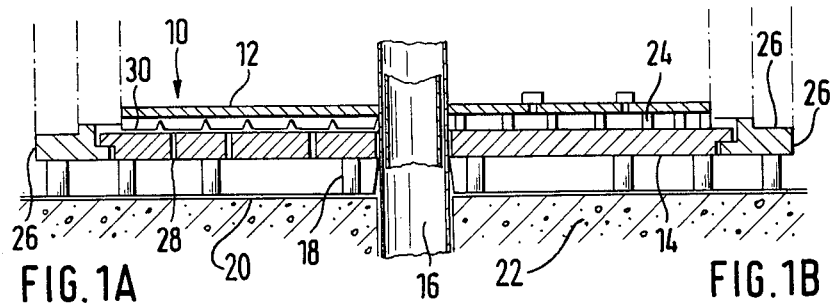
FIG. 1a shows a cross section of the bottom shield in the area of the upper bearing supports.
Figures 2A, 2B, 2C:
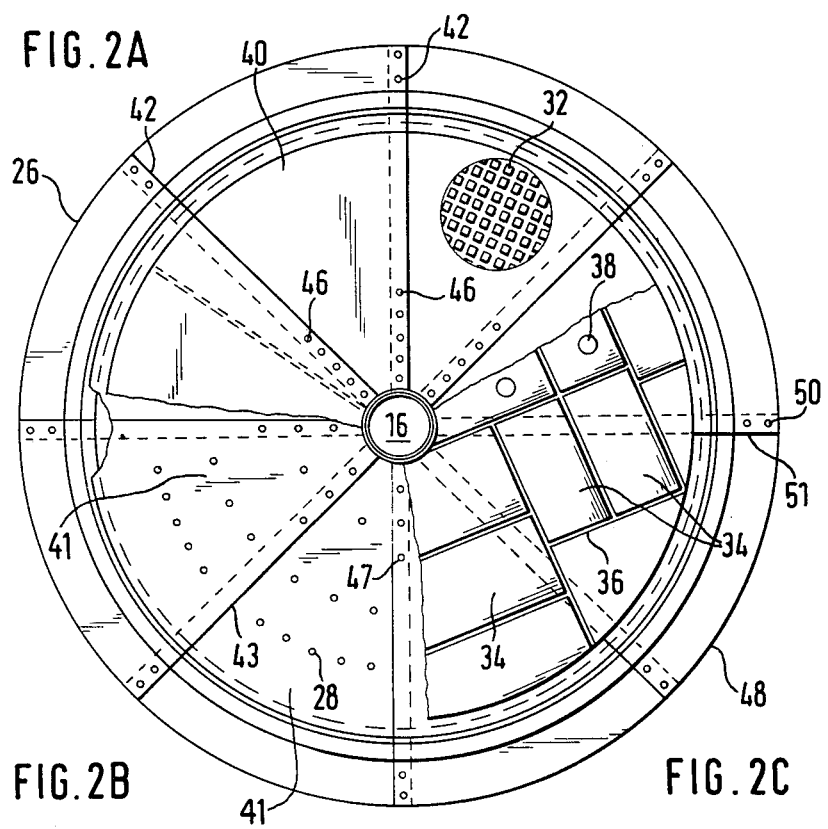
FIG. 2a shows a partial top view of the upper plate of the bottom shield.
FIG. 2b depicts a partial top view of the lower plate of the bottom shield.
FIG. 2c illustrates an enlarged partial view of the upper plate.

The bottom shield, generally designated 10 and arranged underneath the reactor core, not shown, consists essentially of an upper thin plate 12 and a lower thick plate 14 placed concentrically around a socket 16. The lower plate 14 is held at a distance from the bottom liner 20 of the prestressed concrete pressure vessel 22 by means of the lower bearing supports 18 distributed over the entire surface. The upper plate 12 is held at a distance from the lower plate by means of uniformly distributed bearing supports 24. The lower plate 14 is surrounded by a supporting ring 26 and is equipped with passage orifices 28, distributed over the entire surface for the cooling gas. The upper plate 12 is provided on its bottom side with a plurality of cooling ribs 30 in a distribution over its entire surface. Its surface has either a waffled surface 32 or a flat layer consisting of sheet metal sections 34. Expansion gaps 36 are provided between the sheet metal sections. The latter are secured by means of studs 38. The upper and lower plates 12 and 14 are composed of circular segments 40, 41, joined with each other along the concentric and overlapping partition seams 42 by means of pins 46, 47. The support ring 26 surrounding the lower plate 14 is also composed of segments 48 connected with each other at the partition seams 51 by means of pins 50.

The specification and drawings set forth preferred embodiments of the invention. It should be noted, however, that the invention is not limited to those specific embodiments and methods specifically disclosed, but extends instead to all embodiments, substitute and equivalent constructions falling within the scope of the invention as defined by the claims.

We claim:

1. A gas cooled, high temperature nuclear reactor installation comprising:
   a prestressed concrete pressure vessel having a reactor cavity;
   a steel liner for said reactor cavity attached to said pressure vessel, said steel liner having a bottom member; and
   a bottom shield mounted on said bottom member of said liner wherein said bottom shield comprises:
     an upper circular plate formed from a plurality of interconnected upper plate members, said interconnected upper plate members being sector-shaped with overlapping radial portions, and secured together only within the inner half of the radius of said upper circular plate at said overlapping radial portions;
     a lower circular plate disposed beneath said first circular plate formed from a plurality of interconnected lower plate members, said interconnected lower plate members being sector-shaped with overlapping radial portions and connected together only within the inner half of the radius of said lower circular plate at said overlapping radial portions;
     first means for spacing said first plate from said second plate coaxially thereto; and
     second means for spacing said second plate member above said bottom member of said liner.

2. A nuclear reactor installation as claimed in claim 1 in which said upper circular plate is thinner than said lower circular plate.

3. A nuclear reactor installation as claimed in claim 2 in which said lower circular plate is provided with passage orifices to permit cooling gas to flow into the space created by said first spacing means and onto said upper circular plate.

4. A nuclear reactor installation as claimed in claim 3 wherein said first and second spacing means comprise a plurality of bearing supports.

5. A nuclear reactor installation as claimed in claim 4 further comprising:
   a supporting ring formed of a plurality of interconnected supporting ring members, said supporting ring circumferentially surrounding said lower circular plate.

6. A nuclear reactor installation as claimed in claim 5 wherein said interconnecting plate members are secured by means of pins in said overlapping radial portions.

7. A nuclear reactor installation as claimed in claim 6 further comprising a plurality of sheet metal plates secured in spaced relation to one another on the upper surface of said upper circular plate by means of pins, thereby forming a plurality of expansion gaps.

8. A nuclear reactor installation as claimed in claim 7 wherein said upper circular plate has a waffle-like pattern on its upper surface.

9. A nuclear reactor installation as claimed in claim 8 wherein said upper circular plate has a ribbed lower surface.

10. A nuclear reactor installation as claimed in claim 9 wherein said distances between said bearing supports for said upper circular plate are smaller than the distances between said bearing supports for said lower circular plate.

* * * * *